(12) United States Patent
Abrate et al.

(10) Patent No.: US 7,642,504 B2
(45) Date of Patent: Jan. 5, 2010

(54) SYSTEM AND METHOD FOR MEASURING FORCES

(75) Inventors: Silvio Abrate, Savigliano (IT); Guido Perrone, Biella (IT)

(73) Assignees: Fondazione Torino Wireless, Turin (IT); Istituto Superiore Mario Boella, Turin (IT)

(*) Notice: Subject to any disclaimer, the term of this patent is extended or adjusted under 35 U.S.C. 154(b) by 0 days.

(21) Appl. No.: 11/494,864

(22) Filed: Jul. 28, 2006

(65) Prior Publication Data

US 2007/0181788 A1 Aug. 9, 2007

(30) Foreign Application Priority Data

Jul. 28, 2005 (EP) ................... 05016460

(51) Int. Cl.
*G01J 1/04* (2006.01)
*G01J 5/08* (2006.01)
*G02B 6/00* (2006.01)

(52) U.S. Cl. .................. 250/227.14; 250/227.17; 385/12

(58) Field of Classification Search ............ 250/227.11, 250/227.14, 227.17; 385/12, 13
See application file for complete search history.

(56) References Cited

U.S. PATENT DOCUMENTS

| | | | |
|---|---|---|---|
| 4,345,481 A | 8/1982 | Schroyer | 73/862.34 |
| 4,637,264 A | 1/1987 | Takahashi et al. | 73/862.33 |
| 5,061,847 A | 10/1991 | Hazan et al. | 250/227.17 |
| 5,381,005 A | 1/1995 | Chazelas et al. | 250/227.19 |
| 6,363,180 B1* | 3/2002 | Yamate et al. | 385/12 |
| 6,591,025 B1* | 7/2003 | Siems et al. | 385/12 |
| 7,241,986 B2* | 7/2007 | Wang | 250/227.14 |
| 2004/0099801 A1* | 5/2004 | Schulz et al. | 250/227.14 |
| 2004/0129868 A1* | 7/2004 | Kilmartin | 250/227.14 |

(Continued)

FOREIGN PATENT DOCUMENTS

| | | |
|---|---|---|
| CH | 645 733 A5 | 1/1980 |
| DE | 195 23 756 A1 | 6/1995 |

(Continued)

OTHER PUBLICATIONS

European Search Report (EP 05 01 6459) dated Dec. 16, 2005.

(Continued)

*Primary Examiner*—John R Lee
(74) *Attorney, Agent, or Firm*—McDonnell Boehnen Hulbert & Berghoff LLP

(57) ABSTRACT

Optical transducers are provided for detecting forces such as, rotation and transversal forces acting on them, wherein, for the purpose of detecting the forces, optical signals are transmitted through an optical path, for instance defined by an optical fiber. Moreover, polarization scrambling means are provided together with polarizing means, with the polarization scrambling means being adapted to render the polarization of the optical signals entering the optical path either parallel or perpendicular to the axis of polarization of the polarizing means. The polarization of optical signals transmitted through the transducer is further modified as a result of forces acting on the transducer so that the optical signals exiting the transducer can be used for the purpose of detecting the forces.

30 Claims, 8 Drawing Sheets

U.S. PATENT DOCUMENTS

2005/0200941 A1* 9/2005 Yao .............................. 359/301
2006/0023987 A1* 2/2006 Yao .............................. 385/11
2006/0081772 A1* 4/2006 Williams et al. ......... 250/227.14

FOREIGN PATENT DOCUMENTS

| EP | 0 455 241 A2 | 11/1991 |
|---|---|---|
| JP | 57136117 | 8/1982 |
| JP | 59060333 | 4/1984 |

OTHER PUBLICATIONS

European Search Report (EP 05 01 6460) dated Jan. 19, 2006.
Thiebeaux J., WO8001720A1: Optical Device, Jan. 31, 1980.
U.S. Appl. No. 11/494,955, filed Jul. 28, 2006 entitled "Device and System For Measuring Forces".

* cited by examiner

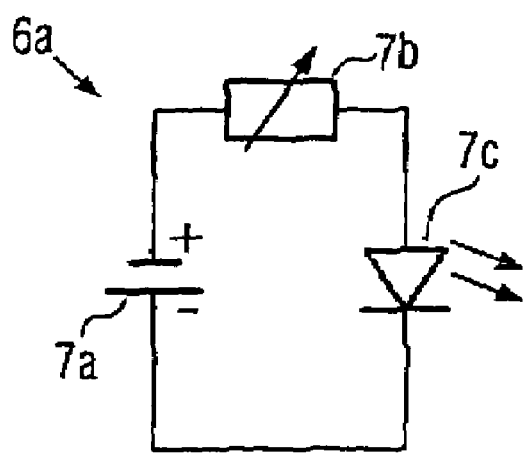 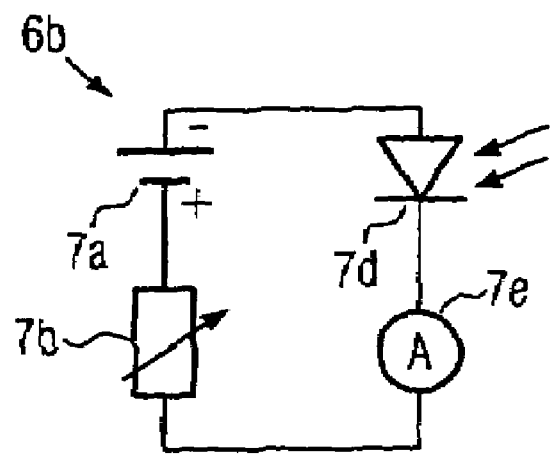
FIG.2a  FIG.2b
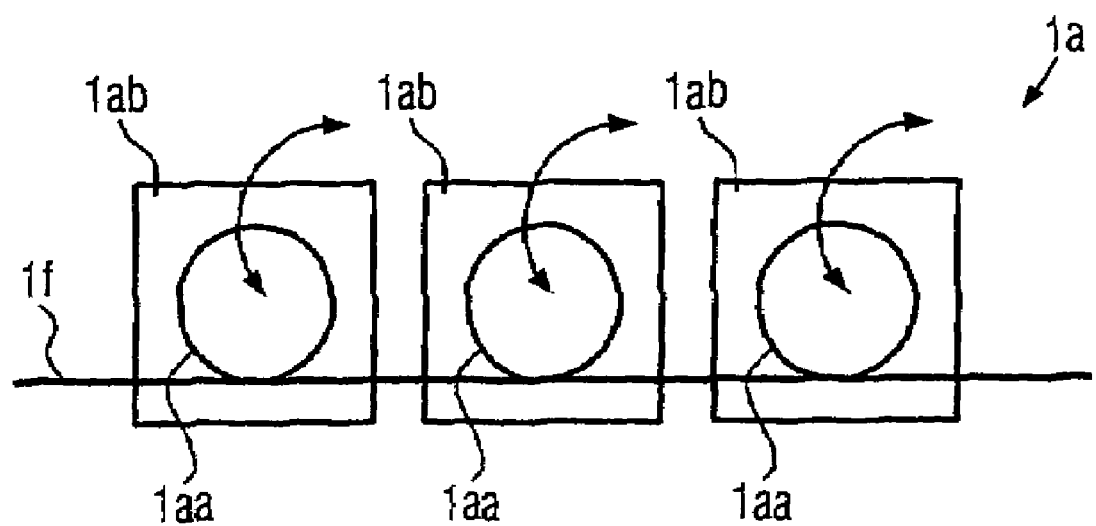
FIG.2c

SYSTEM AND METHOD FOR MEASURING FORCES

This application claims the priority of European Patent Application No. 05016460.7, filed Jul. 28, 2005.

BACKGROUND

The present invention relates to the measurement of forces. In particular, the present invention relates to the measurement of mechanical forces, such as, for example, transversal forces (such as pressure) and rotational forces (such as torque). In more detail, the present invention relates to the measurement of forces by using optical transducers.

During recent years, much development work has been devoted to providing devices adapted to measure and/or detect mechanical forces in a very reliable manner. Among the devices and systems developed and proposed, systems and devices based on very sophisticated electronic assemblies became the most largely used devices and systems. This, in particular, was due to the fact that the development in the sector of integrated circuits and the corresponding reduction in size of circuits exploiting very complicated functions, allowed the provision of very small electronic transducers, adapted to be used for different purposes and under very difficult conditions. For instance, electronic transducers are known, the size of which is kept less than a few cubic millimeters. Moreover, the last developments in the field of the computing means, in particular, in the field of the software adapted for elaborating very big quantities of data in an always shorter time, allowed the data detected by the electronic transducers to be elaborated in an automatic and reliable manner. Finally, the decreasing costs of electronic systems allowed containment of the costs for producing electronic transducers, thus allowing such electronic transducers to be used for several purposes and applications.

However, in spite of the advantages offered by electronic transducers, electronic transducers are not free from drawbacks, especially when they are to be used for measuring mechanical forces, such as, for example, pressures and torques. The most relevant drawback affecting electronic transducers arises from the fact that electrical current is needed for operating the electronic transducers. In the case of a force acting on an electronic transducer, the electrical current flowing through the transducer is influenced by the force acting on it, so that the variations in the current flow may be detected and used for obtaining an indication of the intensity of the force acting on the transducer.

However, the electrical current flowing through the electronic transducers may also be influenced by the external environment, thus rendering electronic transducers less reliable for applications in critical environments, such as in structures exposed to electrostatic discharges during thunderstorms or in electromagnetically noisy industrial premises. Moreover, it may become difficult or risky to use electronic transducers in storage areas of highly flammable materials. Finally, some electronic transducers are also not suitable for certain biomedical applications because the risk of electrocution may arise. I Some attempts have also been made in the last years for overcoming the drawbacks affecting electronic forces measurement systems. In particular, in the last years, some efforts have been devoted to the development of optical transducers. These optical transducers are based on the consideration that forces, in particular mechanical forces such as pressure or torque, may be measured and/or detected using evaluations of the effects on light transmitted through an optical path caused by a force acting, either directly or indirectly, on said optical path. In particular, the working principle of many of the known optical transducers exploits the variation in the photocurrent detected at the output of an optical path with the optical signal attenuation caused by the variation of the optical link attenuation or by the signal interference that are controlled by the force under test. In fact, it has been observed that a relationship may be established between the photocurrent detected at the output of an optical path with the mechanical stress acting on the mechanical path. In particular, some of these known optical transducers exploit the variation of polarization in optical fibers with induced microstresses caused by an external applied force. Unfortunately, however, these known optical transducers based on the variation of polarization are themselves not free from drawbacks which limit their use to only few applications. Moreover, the results of the measurements exploited with these known optical transducers are mostly not as reliable as desired. Finally, assembling and manufacturing these known optical transducers is quite cumbersome and, therefore, quite expensive since it requires stringent mechanical tolerances.

The drawbacks affecting these known optical transducers mostly arise since said optical transducers are based on the interference of two orthogonally polarized modes and require, therefore, special, highly birefringent fibers and very precise mechanical housings. In more detail, these known optical transducers are based on the detection of the variations in polarization of the light beam transmitted through a birefringent optical fiber; the application of a mechanical stress to the fiber produces a substantial number of interference fringes and a phase measuring system is used to determine the change in birefringence induced by the mechanical stress, and hence the value of the mechanical stress itself.

Accordingly, in view of the problems explained above, it would be desirable to provide a technology that may solve or reduce these problems, while maintaining all the positive characteristics of fiber based sensors. In particular, it would be desirable to provide transducers suitable to be used in structures exposed to electrostatic discharges and/or in noisy industrial premises, or even in storage areas of highly flammable materials. In the same way, it would be desirable to provide transducers for measuring and/or detecting forces suitable to be used for biomedical applications. Furthermore, it would be desirable to provide transducers characterized by low cost, light weight, reduced size and minimal invasiveness. It would also be desirable to provide transducers for the purpose of reliably measuring forces, which could be used in combination with low cost, simple and well known equipment. Finally, it would be desirable to provide transducers which allow those drawbacks to be overcome that affect the known optical transducers; in particular, it would be desirable to provide optical transducers based on standard single mode optical fibers (SMF).

SUMMARY

Forces, in particular, mechanical forces such as pressure or torque may be measured and/or detected on the basis of the variations to which the polarization of an optical signal is subjected when the optical signal is transmitted through an optical path and the forces act, either directly or indirectly, on the optical path. In particular, a relationship may be established between the optical signal exiting the optical path and the forces acting on the optical path. If an optical path comprises polarization scrambling means adapted to emit optical signals of a predefined polarization and polarizing means adapted to select only a specific polarization at the receiving side, the power (intensity) of the optical signal exiting the optical path will depend on the variation in polarization of the optical signal transmitted through the optical path as a result of a force or stress acting on the optical path. Accordingly, a relationship may be established between the power and/or intensity of the optical signal exiting the optical path and the force acting on the optical path. Moreover, since the optical signal exiting the optical path may be converted into a measure of current and/or voltage, a relationship may be established between the current or voltage as measured and the force acting on the optical path.

Furthermore, if an optical signal of predefined polarization is introduced into the optical path, for instance parallel or perpendicular to the axis of polarization of polarizing means placed at the output of the optical path, optical signals of either maximum or minimum intensity or power may be collected at the output of the optical path in absence of any force acting on the optical path. Accordingly, in the case of forces acting on the optical path, either the decrease (in the case that the polarization of the light entering the optical path is parallel to the axis of polarization of the polarizing means) or the increase of the intensity of the optical signal exiting the optical path (in the case of an optical signal with a polarization orthogonal to the axis of polarization of the polarizing means) may be brought into relationship with the forces acting on the optical path. Such a detection approach may be used for the purpose of detecting and/or measuring forces, in particular, mechanical forces, such as, for example, pressure or torque. Moreover, when standard single mode fibers are used for the purpose of defining an optical path, further advantages arise in terms of costs, besides the advantages common also to standard and birefringent optical fibers such as light weight, minimal invasiveness, immunity to electromagnetic interferences and the impossibility of starting a fire or an explosion.

Taking these principles into consideration, one embodiment of an optical transducer includes an optical path adapted to transmit optical signals therethrough, the optical path comprising sensing means adapted to modify the transmission of the optical signals through the optical path as a result of a force acting on them; the transducer being characterized in that the optical path comprises polarization scrambling means adapted to modify the polarization of optical signals entering the optical path and polarizing means adapted to emit optical signals of a predefined polarization.

According to another embodiment, an optical transducer is provided wherein the polarization scrambling means comprise a first portion of the optical fiber.

According to still another embodiment, an optical transducer is provided wherein a third portion of the optical fiber has a predefined axis of polarization, thus allowing transmission of optical signals whose polarization is parallel to the predefined axis of polarization.

According to a further embodiment, a measuring device is provided, which includes an optical transducer as described herein.

A measuring system is also provided, which comprises at least one measuring device equipped with an optical transducer according as described herein.

According to a further embodiment, a method is provided for detecting forces, namely a method comprising introducing optical signals into the transducer and collecting the optical signals exiting the transducer, the method being characterized in that in absence of any force acting on the transducer, the polarization of the signals entering the transducer is changed by means of polarization scrambling means.

According to further embodiments, there are also provided methods according to which the polarization of the optical signals entering the transducer is rendered substantially parallel or perpendicular, respectively, to the axis of the polarizing means of the transducer.

Further additional embodiments are defined in the appended claims.

BRIEF DESCRIPTION OF THE DRAWINGS

Further advantages, objects and features as well as embodiments of the present invention are defined in the appended claims and will become more apparent with the following detailed description when taken with reference to the accompanying drawings, in which identical corresponding parts are identified using the same reference numbers.

In the drawings:

FIG. 1b is a schematic diagram of the electrical layout of a measuring device implementing the transducer of FIG. 1a.

FIGS. 2a and 2b are schematic diagrams of possible, corresponding components adapted to be used in combination with an optical transducer.

FIG. 2c is a schematic diagram of an example of polarization scrambling means adapted to be used in combination with the optical transducer.

FIGS. 4b and 4c are a schematic top view and side view, respectively, of sensing means adapted to be used in combination with the optical transducer of FIG. 4a.

DETAILED DESCRIPTION

Figure 1A:
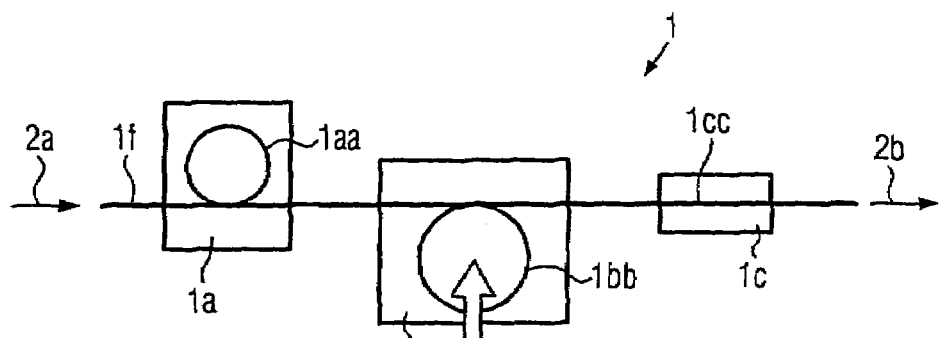
FIG. 1a is a schematic illustration of the operation of an optical transducer according to a first embodiment.

While the invention is described with reference to the embodiments as illustrated in the following detailed description as well as in the drawings, it should be understood that the following detailed description, as well as the drawings, are not intended to limit the invention to the particular illustrative embodiments disclosed, but rather the described illustrative embodiments merely exemplify the various aspects of the invention, the scope of which is defined by the appended claims.

The systems described herein are particularly useful for the detection and/or measurement of transversal forces and rotational forces such as, for example, pressures and torques. For this reason, examples will be given in the following, in which corresponding embodiments of the optical transducer are used for detecting and/or measuring pressures and torques. However, it has to be noted that the use of such optical transducers is not limited to the detection and/or measurement of pressure and torques; on the contrary, these optical transducers may also be used for the purpose of measuring and/or detecting different forces acting on them. These systems, therefore, are also useful for the measurement of all these forces, and the transversal forces (pressure) and/or rotation forces (torque) described in the following are to represent any force acting on the transducers.

In the following, a first example of an optical transducer will be described with reference to FIG. 1a.

In FIG. 1a, reference 1f identifies an optical path (for instance, an optical fiber) adapted to receive, transmit and emit an optical signal. In particular, in FIG. 1a, the optical signal entering the optical path 1f is identified by the reference 2a while the optical signal exiting the optical path is identified by the reference 2b. The optical transducer 1 of FIG. 1a further comprises polarization scrambling means 1a, sensing means 1b and polarizing means 1c. As it will be explained in more detail in the following, the polarization scrambling means 1a, the sensing means 1b and the polarizing means 1c may comprise or even be defined by one or more loops 1aa, 1bb and 1cc, respectively, of said optical fiber 1f. Finally, in FIG. 1a, reference 5 identifies a force and/or mechanical stress (for instance, pressure force or a rotational force) acting on the transducer 1, in particular on the sensing means 1b of said transducer 1.

The expression "polarization scrambling means" should be understood herein as meaning means adapted to change the polarization of an optical signal. For example, the polarization scrambling means may operate so as to render the polarization of the optical signal exiting the polarization scrambling means parallel to a predefined direction or axis. The polarization scrambling means in the illustration changes to polarization of signal 2a (for instance a light signal) entering said polarization scrambling means 1a (after having entered the optical path or fiber 1f) so as to render the polarization of the optical signal exiting said polarization scrambling means parallel to a predefined direction or axis.

The expression "polarizing means" should be understood herein as meaning means adapted to emit optical signals of a predefined polarization. For instance, the polarizing means 1c of FIG. 1a may comprise an axis of polarization parallel to a predefined direction, thus allowing only optical signals with a polarization parallel to the axis of polarization of said polarizing means to exit said polarizing means 1c while optical signals with a polarization not parallel to the axis of polarization of said polarizing means are absorbed or reflected. It should, therefore, be appreciated that the polarizing means 1c comprised in the optical transducer 1 of FIG. 1a acts as a kind of optical filter since only optical signals with a polarization parallel to the axis of polarization of said polarizing means may be transmitted through said polarizing means 1c and emitted therefrom, while optical signals, the polarization of which is not parallel to the axis of polarization of the polarizing means 1c are absorbed and, therefore, neither transmitted through nor emitted from said polarizing means 1c. If it is appreciated that the optical signal 2a entering the optical path 1f usually comprises several components with corresponding different features, in particular with corresponding different wavelengths and polarizations, it has also to be appreciated that only those components entering the polarizing means 1c and having a polarization parallel to the axis of polarization of said polarizing means 1c, will be transmitted through said polarizing means 1c and therefore, emitted.

The expression "sensing means" should be understood herein as meaning means adapted to modify the transmission of optical signals entering the sensing means. In a preferred embodiment, the sensing means is meaning means adapted to modify the polarization of optical signals entering the sensing means 1b as a result of a force (for instance pressure or torque or even any mechanical stress) acting on the sensing means. For instance, in the case that the sensing means 1b comprises one or more loops 1bb of an optical fiber, it can be appreciated that forces acting on the sensing means (and therefore, on the one or more loops of an optical fiber, either directly or indirectly) may constrain or even damage the one or more loops of the optical fiber; the micro-deformations arising in the fiber as a result of the mechanical stress acting on the fiber produce variations in the polarization of the optical signals transmitted through the sensing means. As it will be explained in more detail below, the variations on the polarization of the optical signals may be put into a relationship with the forces or stresses acting on the sensing means 1b.

The operation of the optical transducer 1 depicted in FIG. 1a is as follows. In absence of any applied force 5, the polarization scrambling means 1a are set in order to define the optical signals 2b exiting the optical transducer 1; in other words, by means of the polarization scrambling means 1a, the polarization of the optical signal 2a entering the optical path 1f is changed until the polarization of the optical signal exiting the polarization scrambling means 1a is parallel to a predefined direction. For instance, the polarization of the optical signal exiting the polarization scrambling means 1a may be rendered parallel to the axis of polarization of the polarizing means 1c. Alternatively, by means of the polarization scrambling means 1a, the polarization of the optical signal exiting the polarization scrambling means 1a may be rendered orthogonal to the axis of polarization of the polarizing means 1c. In the first case, namely in the case that the polarization of the optical signal exiting the polarization scrambling means 1a is rendered parallel to the axis of polarization of the polarizing means 1c, the optical signal 2b exiting the optical path 1f (the polarizing means 1c) will substantially correspond to the optical signal 1a entering the optical path 1f or, in other words, the intensity of the output optical signal 2b will substantially correspond to that of the input optical signal 2a with the exception of negligible losses of power due to unavoidable imperfections of the optical path. Accordingly, the strongest, highest possible signal 2b will be collected at the output of the optical transducer 1. On the contrary, in the case that the polarization of the optical signal 2a entering the optical transducer 1 and exiting the polarization scrambling means 1a is rendered orthogonal to the axis of polarization of the polarizing means 1c, and still in the absence of any force or stress 5 acting on the transducer 1 (on the sensing means 1b), essentially no signals will be collected at the output of the optical transducer 1 or the lowest weakest possible signals 2b will be collected.

In the case of a force or stress 5 acting on the transducer (on the sensing means 1b) the transmission of the optical signals through the optical path 1f will be modified as a result of the force or stress 5. In particular, the polarization of the optical signals exiting the polarization scrambling means 1a will be modified as a result of the force 5, due for instance to micro-deformations introduced in the sensing means 1b (for instance in a portion of its one or more fiber loops 1bb). That means that at least some components of the optical signal exiting the sensing means 1b (and thus entering the polarizing means 1c) will have a polarization differing from the polarization of the corresponding components of the optical signal exiting the polarization scrambling means; in other words, the polarization of at least some components of the optical signal exiting the sensing means 1b will differ from the polarization of the corresponding components exiting the polarization scrambling means 1a which, as explained above, was rendered parallel to a predefined direction. Summarizing, the polarization of at least some components of the optical signal exiting the sensing means 1b will no longer be parallel to the predefined direction. It results, therefore, that in the case in which the polarization of the optical signal exiting the polarization scrambling means 1a was rendered parallel to the axis of polarization of the polarizing means 1c, the polarization of at least some components of the optical signal exiting the sensing means 1b will no longer be parallel to the axis of polarization of the polarizing means 1c. Accordingly, the intensity of the optical signal 2b exiting the polarizing means 1c (the optical path 1f) will be lower than the intensity of the optical signal 2a entering the optical path 1f and exiting the polarization scrambling means 1a. The differences between the intensities of the optical signals 2b and 2a will depend on the intensity of the force 5 acting on the sensing means 1b, so that it will be possible to put into relationship the difference between the output signal 2b and the input signal 2a and the intensity of the force 5. In the same way, in the case that the polarization of the optical signal exiting the polarization scrambling means 1a was rendered orthogonal to the axis of polarization of the polarizing means 1c, at least some of the components of the optical signal exiting the sensing means 1b will have a polarization which will no longer be orthogonal to the axis of polarization of the polarizing means 1c as a result of any force or stress 5 acting on the sensing means 1b. It will be, therefore, possible to collect the optical signal 2b exiting the optical transducer 1 (through the polarizing means 1c) and to establish a relationship between the intensity or power of the signal 2b and the intensity of the force or stress 5 acting on the transducer 1.

As it will be explained in more detail in the following, the polarization scrambling means 1a may comprise a first portion of the optical fiber 1f; in particular, the polarization scrambling means may comprise one or more loops 1aa of the optical fiber 1f. In the same way, the sensing means 1b may comprise a second portion of the optical fiber 1f; in particular, the sensing means 1b may comprise one or more loops 1bb of the optical fiber 1f.

In the following, with reference to FIG. 1b, an example of the electrical layout of a measuring device will be described; in FIG. 1b, those parts already described with reference to FIG. 1a are identified with the same reference numerals.

Figure 1B:
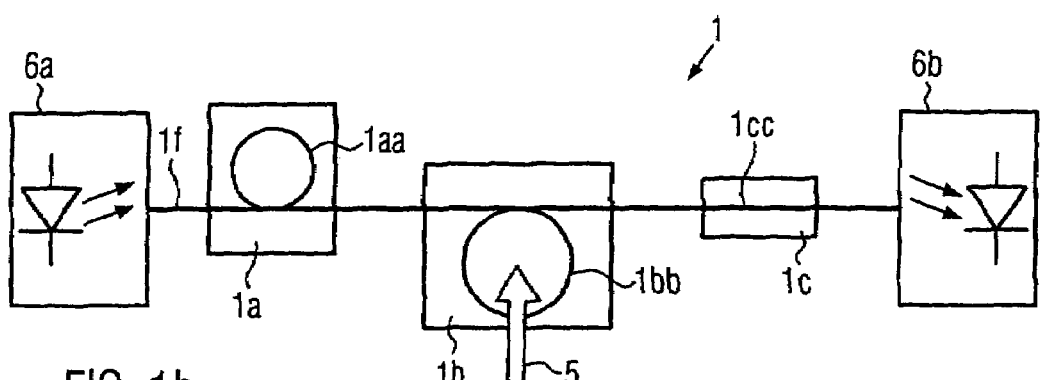

In FIG. 1b, references 6a and 6b identify an optical signals emitting device and an optical signals receiving device, respectively. The device 6a generates and/or emits optical signals which enter the optical path 1f and are transmitted through the optical path defined by the polarization scrambling means 1a, the sensing means 1b and the polarizing means 1c and are eventually partially or totally absorbed by the polarizing means 1c. The resulting optical signals exiting the polarizing means 1c are received and/or collected by the receiving device 6b. For instance, the emitting device 6a may comprise a current or voltage generator connected to a laser light source; in the same way, the receiving device 6b may comprise an amplified photo-detector with a photo diode followed by a low noise amplifier. However, many solutions may be adopted for the purpose of generating optical signals entering the optical path 1f and for the purpose of receiving optical signals exiting the optical path 1f. For the operation of the device, current or voltage signals are converted into optical signals 2a entering the transducer 1, and that the optical signals 2b exiting the transducer 1 are converted into either current or voltage signals so that the resulting current and/or voltage signals may be elaborated for the purpose of detecting the force 5 acting on the transducer 1.

In the following, with reference to FIGS. 2a and 2b, examples will be described of an emitting device and a receiving device, respectively, adapted to be used in combination with an optical transducer.

The emitting device 6a depicted schematically in FIG. 2a comprises a voltage source 7a, a variable resistor 7b and a light emitting laser device 7c; in this way, the current flowing through the circuit and entering the laser 7c is converted into optical signals adapted to enter the optical transducer 1 as depicted in FIGS. 1a and 1b. In the same way, the receiving device 6b depicted in FIG. 2b comprises a voltage source 7a, a resistor 7b and a photo-diode 7d that converts the incident optical signals into current signals; by means of the measuring device 7e, the resulting current may be measured. It has, however, to be noted that the emitting device 6a and the receiving device 6b depicted in FIGS. 2a and 2b, respectively, only represent two possible examples of devices adapted to be used in combination with the transducer. Of course, alternative or different solutions may be used among those known in the art and without departing from the scope of the present invention; for instance, according to the circumstances, the optical signals may be converted into voltage signals and a voltage measuring device 7e may be used for measuring the outcoming voltage signals.

As stated above, for the purpose of carrying out measurements and/or detections of forces by means of the optical transducer, it is advisable to equip the optical transducer with polarization scrambling means adapted to render the polarization of the optical signals entering the optical path 1f and exiting the polarization scrambling means either parallel or orthogonal to the axis of polarization of the polarizing means 1c. In the following, an example of polarizing means adapted to be used in combination with the optical transducer will be disclosed with reference to FIG. 2c, wherein component parts already described with reference to previous figures are identified with the same reference numerals.

In the example depicted in FIG. 2c, the polarization scrambling means 1a depicted therein comprises several loops 1aa of an optical fiber 1f. Moreover, the polarization scrambling means 1a comprises several plates 1ab. For instance, the plates 1ab may be metal plates; however, depending on the circumstances, plates of other materials may be used such as, for example Plexiglas plates. Each plate 1ab includes one or more loops 1aa of the optical fiber 1f. For instance, for the purpose of fixing the fiber loops 1aa to the corresponding plate 1ab, the optical loops 1aa may be embedded in the plate 1ab; this particularly applies in the case of Plexiglas plates 1ab. Alternatively, depending on the circumstances (for instance on the material of the plates 1ab) other solutions may be adopted for the purpose of fixing the fiber loops 1aa to a corresponding plate 1ab; for instance, in the case of metal plates, the fiber loops 1aa may be glued or stuck to the metal plates 1ab. When looking at FIG. 2c, it may be appreciated that each of the metal plates 1ab may be rotated on a predefined axis of rotation; in particular, in the case of FIG. 2c, each of the plates 1ab may be rotated on an axis substantially parallel to the optical fiber 1f or at least to the direction of transmission of the optical signals through the optical fiber 1f. Accordingly, it may also be appreciated that rotating one or more of the plates 1ab and, therefore, the corresponding fiber loops fixed thereto will influence the polarization of the optical signals exiting the polarization scrambling means 1a. It results, therefore, that it will be possible to select the polarization of the optical signals exiting the polarization scrambling means 1a simply by rotating one or more of the optical plates 1ab, either simultaneously or not. It will, therefore, be possible to render the polarization of the optical signals exiting the polarization scrambling means 1*a* parallel to a predefined direction; in particular, it will be possible to render the polarization of the optical signals exiting the polarization scrambling means 1*a* either parallel or perpendicular to the axis of polarization of the polarizing means 1*c* depicted in FIG. 1*a* and 1*b*. In particular, rotating one or more of the plates 1*ab* may be exploited or carried out either manually (by a user managing the transducer) or automatically by means of automatic devices adapted to this end. Various automatic devices among those known in the art may be used for the purpose of rotating one or more of the plates 1*ab* of the polarization scrambling means 1*a* of FIG. 2*c*.

In the following, a further embodiment of a transducer will be described with reference to FIGS. 3*a* and 3*b*, where corresponding or identical parts already described with reference to previous figures are identified using the same reference numerals.

The transducer depicted in FIG. 3*a* substantially corresponds to the transducer as described with reference to FIGS. 1*a* and 1*b* and comprises, therefore, an optical path 1*f* (an optical fiber in this example), polarization scrambling means 1*a* (eventually comprising one or more loops 1*aa* of the optical fiber 1*f*), sensing means 1*b* (eventually comprising one or more loops 1*bb* of the optical fiber 1*f*) and polarizing means 1*c*. However, the transducer 1 depicted in FIG. 3*a* differs from the transducer disclosed above with reference to figures 1*a* and 1*b* in that, the transducer of FIGS. 3*a* and 3*b* is equipped with sensing means 1*b* specially adapted for sensing and/or detecting rotation and/or torsion forces 5. To this end, the sensing means 1*b* of FIGS. 3*a* and 3*b* comprises one or more fiber loops 1*bb* firmly fixed to a rotation plate 1*bp*. For instance, as depicted in FIG. 3*b*, the one or more fiber loops 1*bb* may be embedded in the plate 1*bp*; however, depending on the circumstances, other solutions are possible, such as, for instance, fixing the one or more fiber loops 1*bb* to the plate 1*bp* by gluing. The two opposite end portions of the one or more fiber loops 1*bb* exiting the plate 1*bp* are fixed to the optical fiber 1*f* at corresponding fixing points 4*a* and 4*b*, respectively. In the case of a force 5 rotating the plate 1*bb* (see for instance FIG. 3*b*), the transmission of the optical signals crossing the sensing means 1*b* will be modified; in particular, the polarization of at least some components of the optical signal exiting the sensing means 1*b* will differs from the polarization of the corresponding components of the optical signal 2*a* entering the optical fiber 1*f* and exiting the polarization scrambling means 1*a*. Accordingly, if, in a way similar to the way the transducer depicted in FIGS. 1*a* and 1*b*, the polarization of the optical signals exiting the polarization scrambling means 1*a* was rendered either parallel or perpendicular to the axis of polarization of the polarizing means 1*c*, the polarization of at least some components of the optical signal exiting the sensing means 1*b* will no longer be parallel or perpendicular to the axis of polarization of the polarizing means 1*c*, so that, in the case of a force 5 displacing the plate 1*bp*, optical signals 2*b* will be collected at the output of the optical transducer 1, differing from the optical signals which would have been collected in absence of any force acting on the plate 1*bp*. In particular, in the case that the polarization of the optical signals 2*a* was rendered parallel to the axis of polarization of the polarizing means 1*c*, optical signals 2*b* will be collected at the output of the transducer, the intensity or power of which will be lower than that of the optical signals 2*b* which would have been collected in absence of any force acting on the transducer. In a similar way, in the case that the polarization of the optical signals 2*a* entering the optical path 1*f* was rendered octagonal to the axis of polarization of the polarizing means 1*c* (in the absence of any force acting on the transducer), optical signals 2*b* will be collected at the output of the optical transducer in the case of a force 5 acting on the plate 1*bp*, the intensity of which will be higher than that of the optical signals which would have been collected in absence of any force acting on the transducer.

Figure 3A:
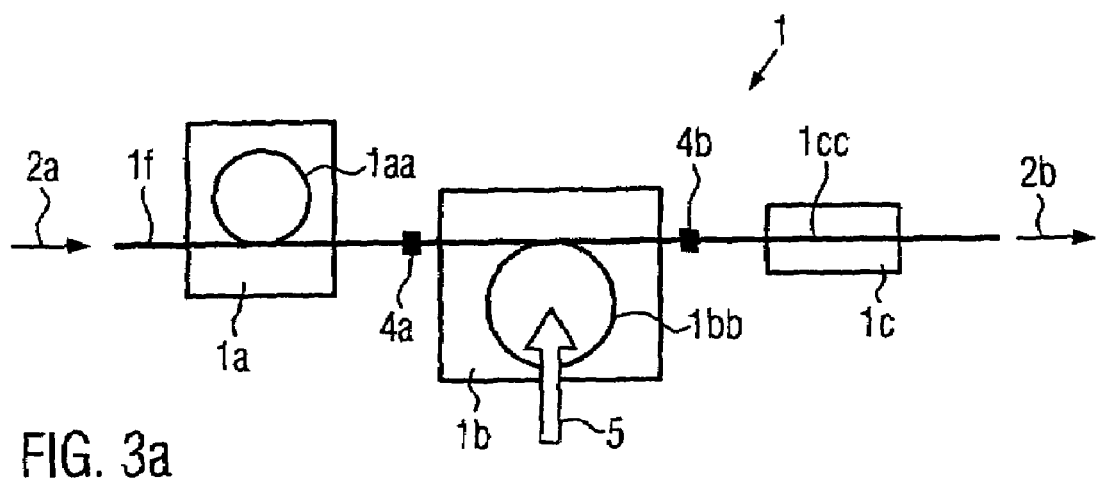
FIGS. 3a and 3b are a schematic top view and a schematic cross sectional view, respectively, of a further embodiment of the optical transducer.
Figure 3B:
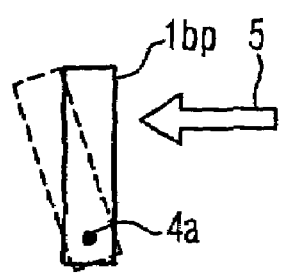

Of course, the layout of a measuring device implementing the optical transducer of FIGS. 3*a* and 3*b* may correspond to that of the measuring device implementing the optical transducer of FIG. 1*a* and depicted in FIG. 1*b*; accordingly, for more details concerning the measuring device implementing the optical transducer of FIGS. 3*a* and 3*b*, reference is made to FIG. 1*b* and the corresponding disclosure.

In the following, with reference to FIGS. 4*a* and 4*c*, a further example of a transducer will be described; again, in FIGS. 4*a* and 4*b*, those parts and/or features of the transducer depicted therein already described with reference to previous figures, are identified with the same reference numerals.

Figure 4A:
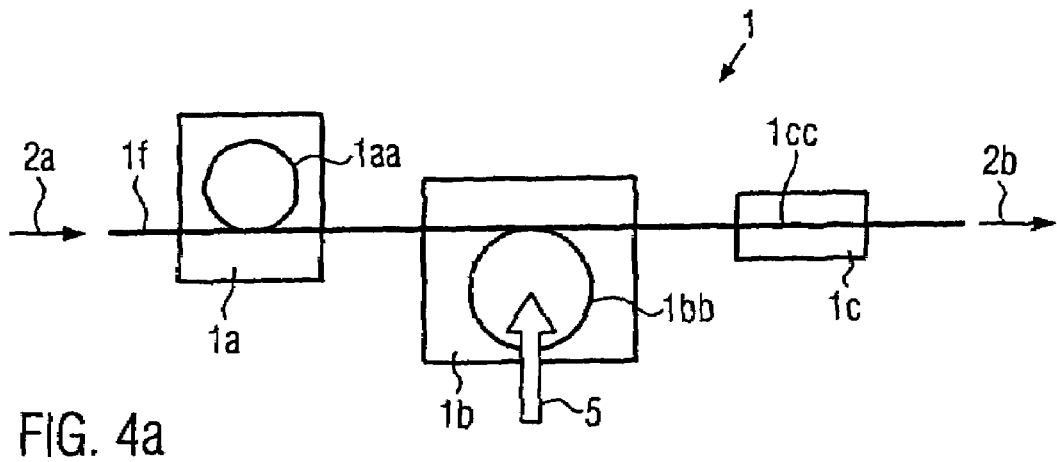
FIG. 4a schematically depicts a further embodiment of the optical transducer.
Figure 4B:
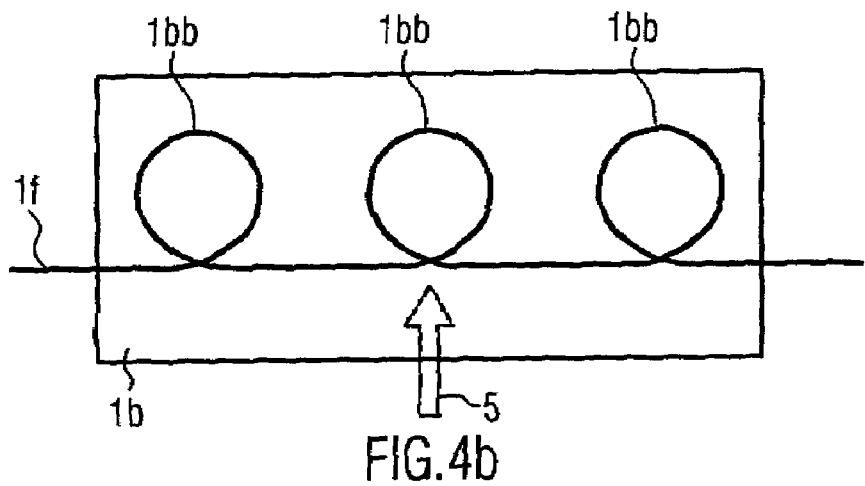
Figure 4C:
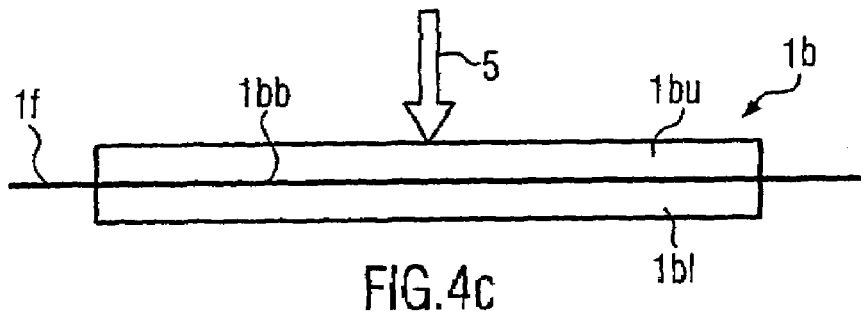
Figure 4D:
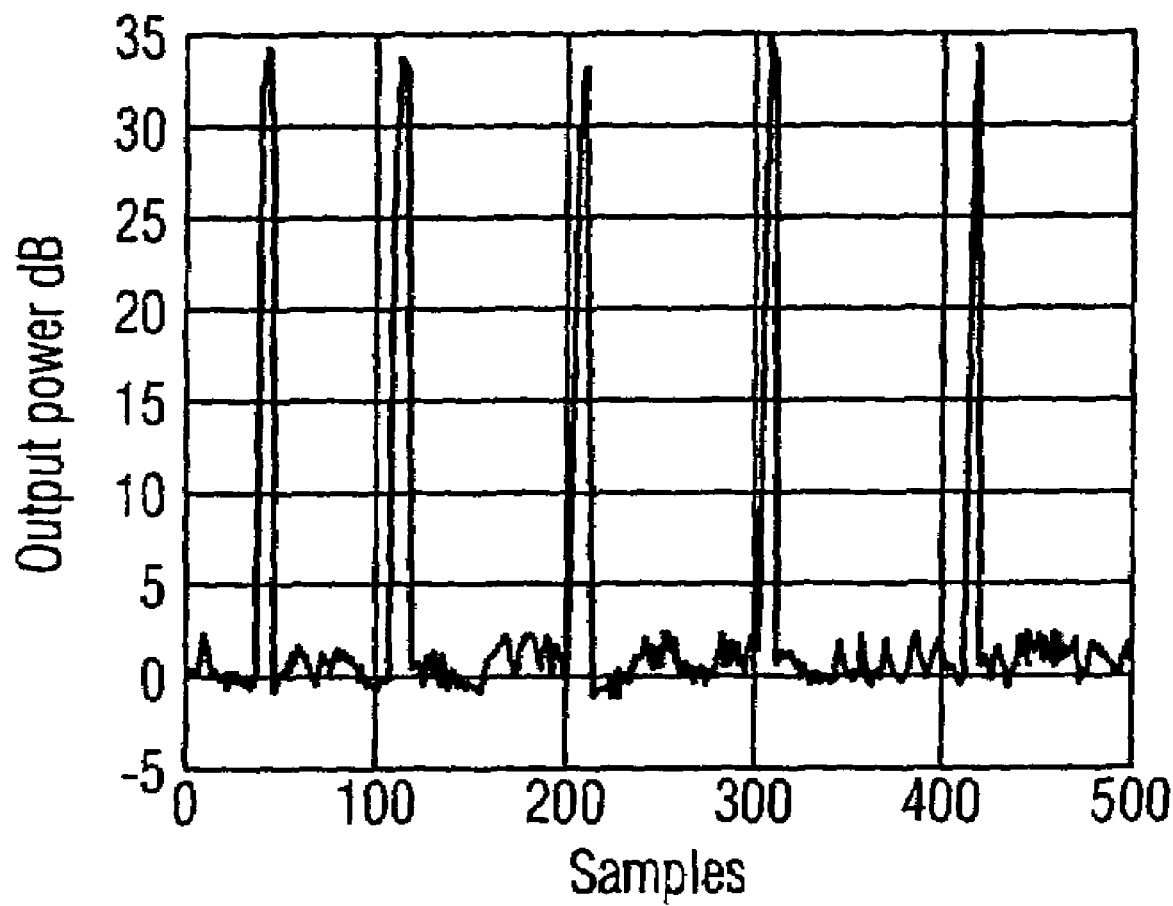
FIG. 4d is a graph depicting an example of the output of the optical signals collected at the output of the optical transducer.

The features of the optical transducer depicted in FIGS. 4*a*, 4*b* and 4*c* which distinguish this optical transducer from those disclosed above with reference to FIGS. 1*a* and 3*a*-3*b* relates again to the sensing means 1*b* of the optical transducer. All other component parts of the optical transducer 1 depicted in FIGS. 4*a*-4*c* substantially correspond to those of the optical transducers previously described. In the case of the optical transducer of FIGS. 4*a*-4*c*, the sensing means 1*b* comprises several fiber loops 1*bb* (3 in the example of FIG. 4*b*) embedded between two rigid plates; in particular, an example with three fiber loops 1*bb* embedded between an upper plate 1*bu* and a lower plate 1*bl* is depicted in FIG. 4*c*. For instance, the upper and lower plates 1*bu* and 1*bl* may be metal plates. However, other materials may be used among those adapted to confer adequate rigidity to the plates 1*bu* and 1*bl*. The assembly depicted in FIG. 4*c* renders the sensing means 1*b* particularly suitable for the measurement of pressures of similar forces. The pressure 5 acting on the sensing means 1*b* (either on the upper plate 1*bu* or on the lower plate 1*bl*) gives rise to micro deformations of one or both the rigid plates 1*bu* and 1*bl*. These micro deformations in turn give rise to corresponding micro deformations of one of the fiber loops 1*bb*. The same considerations, therefore, apply as pointed out in the case of the optical transducers as disclosed above with reference to FIGS. 1*a* and 3*a*-3*b*. In fact, the micro deformations of one or more of the fiber loops 1*bb* result in the transmission of the optical signal crossing the sensing means 1*b* being modified; in particular, the polarization of the optical signals crossing the sensing means 1*b* will be modified as a result of the pressure 5 acting on the optical means 1*b*. As stated above, the assembly depicted in FIGS. 4*b* and 4*c* of the sensing means renders the optical transducer of FIG. 4*a* (equipped with these sensing means) particularly suitable for the measurement of pressures. In particular, this is due to the fact that pressures acting on a large area may be detected, with the extension of the area depending on the number and length of the fiber loops 1*bb*. Moreover, also the sensitivity of the sensing means may be defined by opportunely selecting the number of fiber loops 1*bb*. In the case of the transducer described above with reference to FIGS. 4*a*-4*c*, the same consideration applies (relating to the possibility of establishing a relationship between the optical signal collected at the output of the transducer and the force acting on the transducer) as pointed out with respect to the transducers previously described with reference to figures 1*a*, 3*a* and 3*b*. Accordingly, for reasons of clarity, these considerations are not repeated here. FIG. 4*d* depicts an example of the data collected at the output of the optical transducer of FIGS. 4*a*-4*c*.

As apparent from FIG. 4d, in absence of any force acting on the transducer, the power of the optical signals exiting the transducer substantially corresponds to zero. On the contrary, in the case of pressures acting on the transducer, the power of the optical signals exiting the transducer rises to values comprised between 30 and 35 dB. It arises, therefore, from FIG. 4d that the optical transducer of FIG. 4a is particularly suitable to be used as an industrial pressure sensor, for example to count pieces or, in the case of traffic control applications, to count the cars crossing a certain area or in anti-intrusion systems to detect people entering the sensitized area.

In the following, with reference to FIGS. 5a, 5b and 5c, a further example of sensing means will be described, adapted to be implemented in the optical transducer; again, component parts already described with reference to previous figures are identified in FIGS. 5a, 5b and 5c with the same reference numerals.

Figures 5A, 5B:
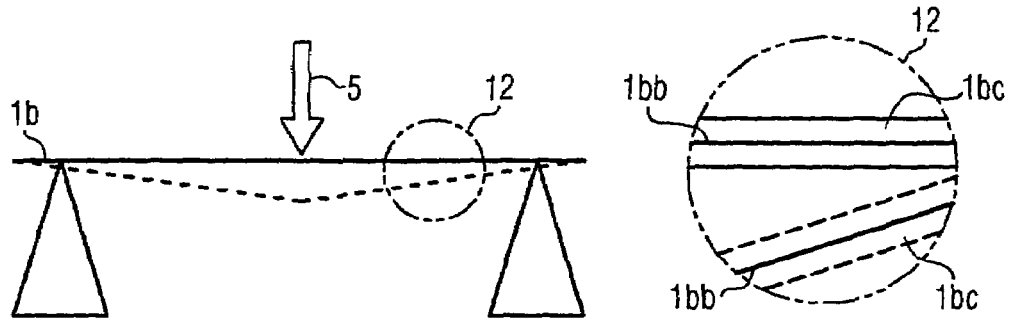
FIGS. 5a and 5b schematically depict a further example of an optical transducer.
Figure 5C:
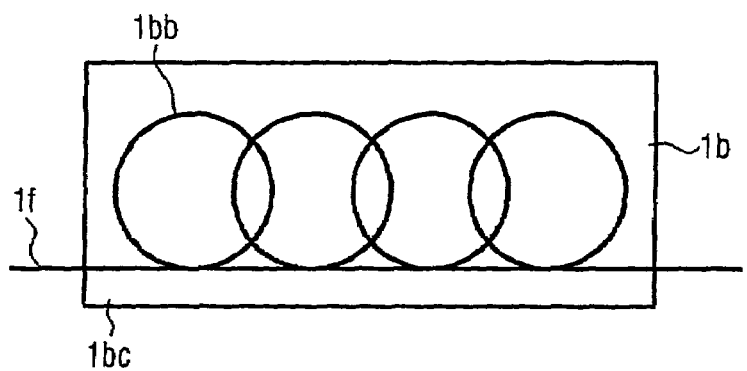
FIG. 5c schematically depicts an example of sensing means adapted to be used in combination with the optical transducer of FIGS. 5a and 5b.

In the case depicted in FIGS. 5a, 5b and 5c, four fiber loops 1bb have been embedded into a concrete beam 1bc (see in particular FIG. 5b); this assembly renders the sensing means 1b of FIGS. 5a, 5b and 5c particularly adapted to be loaded with various weights so as to record the deformation of the concrete beam 1bc due to the force 5 acting on the concrete beam 1bc. The possible deformations of the concrete beam 1bc are depicted in particular in FIGS. 5a and 5b. The number of fiber loops 1bb embedded in the concrete beam 1bc may be selected depending on the circumstances and on the sensitivity to be achieved for the sensing means 1b. Moreover, also the material of the concrete beam 1bc may be selected according to the circumstances and depending on the measurements to be carried out.

Figure 5D:
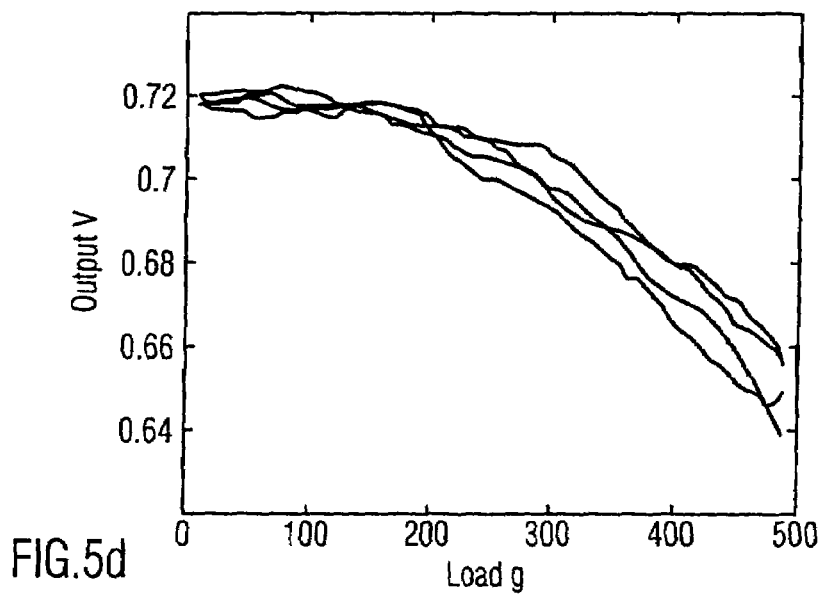
FIG. 5d is a graph illustrating an example of the results of measurements carried out with the optical transducer.

FIG. 5d depicts an example of the measurement capabilities of an optical transducer equipped with sensing means 1b as disclosed with reference to FIGS. 5a-5c but embedded in a Plexiglas beam for demonstration purposes. In particular, FIG. 5d depicts the output readings (in this example, the voltage at the photo-detector output) versus the applied weight relating to four cycles of increasing/decreasing load to evaluate the repeatability and reliability of the system. The substantial correspondence of the curves depicted in FIG. 5d demonstrates the good repeatability of the system. In this respect, it has to be noted that the small deviations from linearity are mainly due to the materials used for the beam 1bc rather that to the intrinsic properties of the transducer itself.

In the following, with reference to FIGS. 6a and 6b, two examples will be described of corresponding measuring equipment adapted to implement an optical transducer.

Figure 6A:
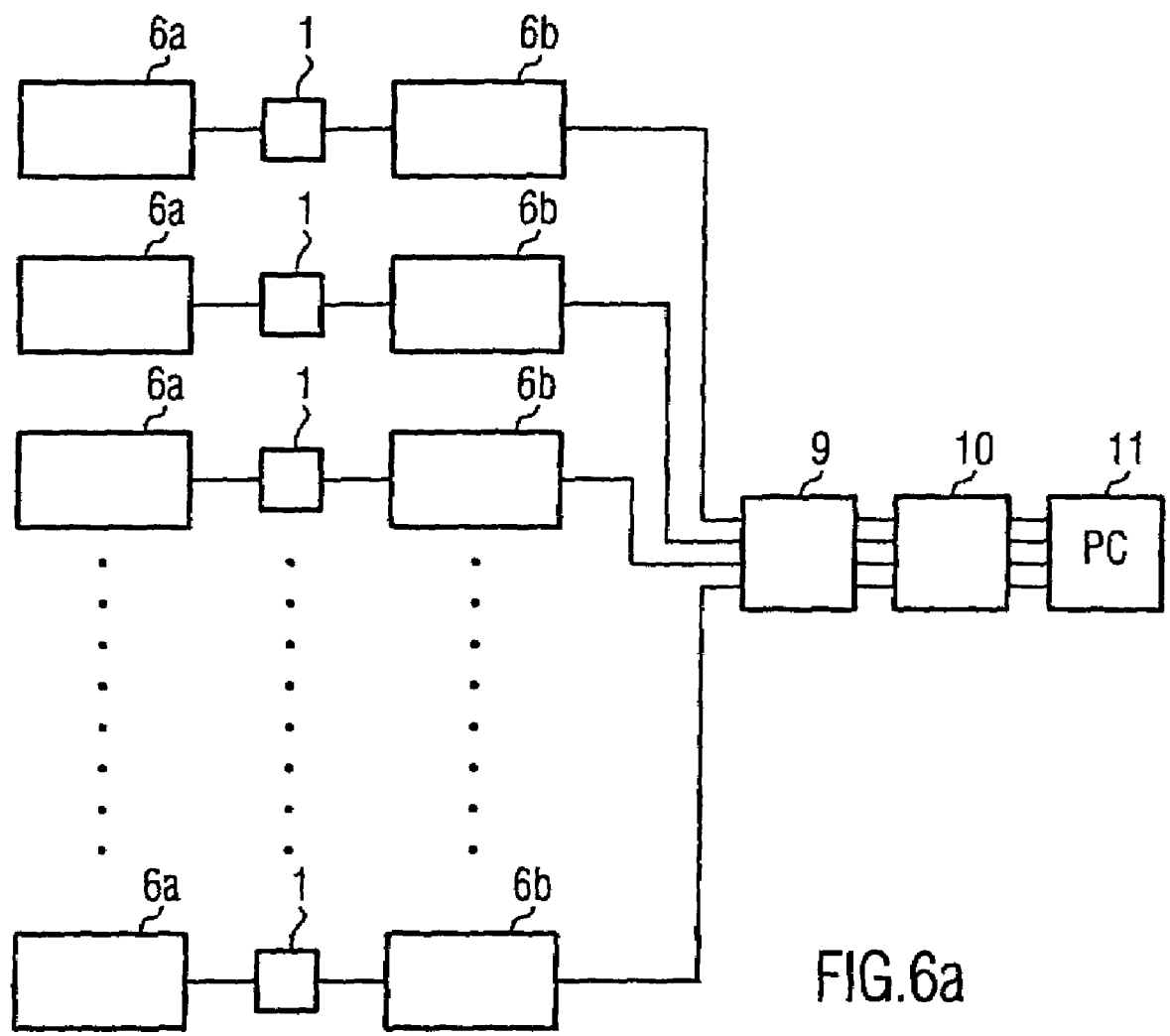
FIGS. 6a and 6b are schematic diagrams of the electrical layouts of corresponding measuring systems implementing the optical transducers.

In FIG. 6a, references 6a identify corresponding emitting devices adapted to emit optical signals; for instance, the emitting devices 6a may be of the kind described with reference to FIG. 2a. It should be noted that the optical source in FIG. 6a may also be made by a single emitting device followed by a proper power splitter that feeds all the sensing arms. References 1 identify optical transducers; these optical transducers may be of any kind among those described above. Moreover, different optical transducers may be used for the purpose of exploiting corresponding different measurements. For instance, some of the transducers 1 of FIG. 6a may be of the kind depicted in FIGS. 3a and 3b and adapted to detect torsion and/or rotational forces. Moreover, some of the transducers 1 of FIG. 6a may be equipped with sensing means as described above with reference to FIGS. 4a-4c, with the sensing means being particularly adapted to detect pressures. Finally, some of the transducers 1 of FIG. 6a may be equipped with sensing means of the kind depicted in FIGS. 5a-5c, thus particularly suitable for the detection of structural deformations. In FIGS. 6a, references 6b identify receiving devices, for instance receiving devices of the kind described with reference to FIG. 2b. Moreover, reference 9 identifies a voltage or current amplifier while reference 10 identifies a device (for instance a digital acquisition board DAQ) adapted to convert current or voltage signals into digital signals. Finally, reference numeral 11 identifies a computing unit adapted to elaborate digital data. The optical signals emitted by the emitting devices 6a enter the optical transducer 1 and, after having being modified as a result of the force acting on the transducers, are received by the receiving devices 6b. The resulting output current and/or voltage signals are collected by the amplifier 9, adequately amplified to a predefined value and filtered. The amplified signals are then converted by the device 10 into digital signals and transmitted to the computing unit (for instance a PC). In this way, several transducers may be controlled simultaneously, so that it is possible to devise also complex networks of sensors and/or transducers. Moreover, the program can evaluate the measurement results, plot the variations of the forces with time and issue a warning if the rating increases over a predefined threshold. Moreover, using suitable software, it is also easy to control the transducer via the WEB using standard protocols such as, for instance TCP/IP.

Figure 6B:
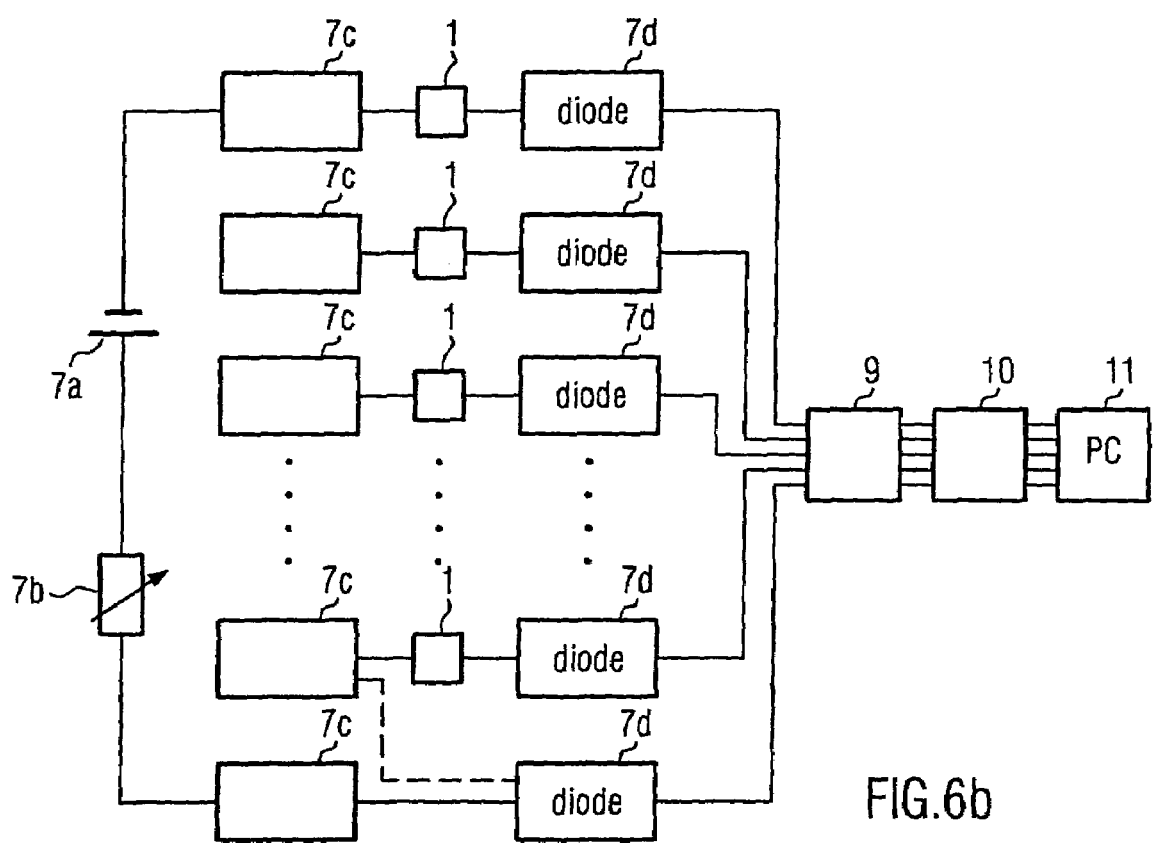

In FIG. 6b, a plurality of laser devices 7c is used, connected in series with a voltage source 7a and resistor 7b. It appears, therefore, clearly that the laser devices 7c defined, in combination with the voltage source 7a and the resistor 7b, a multiple channel emitting device of the kind depicted in FIG. 2a. During operation, the optical signals emitted by the laser devices 7c enter the corresponding optical transducers 1 and, after having been modified as a result of the forces acting on the transducers, are collected by the diodes 7d and then converted into either current or voltage signals. The resulting current or voltage signals exiting the diodes 7d are then amplified and filtered by the amplifier 9, forwarded to the converting means 10 where they are converted into digital signals and finally forwarded to the computing unit 11 where they can be opportunely elaborated. The most important difference between the set up of FIG. 6b and that of FIG. 6a relates to the fact that one of the laser devices 7c (the one at the bottom of FIG. 6b) is directly connected to a corresponding diode 7d; this solution, in particular, adapted for compensating the detection and/or measurement for the fluctuations of the light source, so as to increase the resolution of detecting and/or measuring equipment. This, in particular, is due to the fact that the optical signals emitted by the lowest leisure device in FIG. 6b are not influenced or modified by any transducer (or any force acting on the transducer) but are directly transmitted to the corresponding diode 7d; this leisure device 7c and the corresponding diode 7d experience, therefore, the same fluctuations as the other channels of the measuring equipment and, therefore, may be used as a reference result or point. This solution has proved to give quite accurate results without requiring additional more expensive optical components; however, depending on the circumstances, more accurate results may be achieved by the reading output current from the monitor photo-diodes generally included within the laser diode packages or with an additional coupler to drop a small percentage of the light from the source for monitoring purposes. It is also possible to devote another channel of the measuring equipment of FIG. 6b to acquire the environmental temperature from a low cost commercial integrated temperature sensor (for instance something similar to the TMP35 from Analog Devices) allowing for compensation of the temperature effect, supposing that the various transducer are roughly at the same temperature. More activated compensations including not only temperature effects but also humidity, unwanted strain, age, etc., can be obtained by connecting the reference laser device to its photo-diode so that an uninterrupted reference fiber runs parallel to the monitoring fiber.

It follows from the above disclosure that the optical transducers described herein help to minimize the drawbacks affecting the transducers known in the art; in particular, the optical transducers described herein can allow reliable detection of both transversal forces (such as pressure) and rotational forces (such as torques) as well as structural deformations. Moreover, these optical transducers allow the detection and/or measurement of both forces acting on a simple point and multiple forces acting on corresponding multiple points.

Furthermore, the optical transducers described herein are particularly adapted for applications in a critical environment, such as in electromagnetically noisy industrial premises, in storage areas of highly flammable materials and in structures exposed to electrostatic discharges during thunderstorms. The absence of electrical currents flowing through the transducers may then also be ideal for biomedical applications avoiding the risk of electrocution and for monitoring of monuments and artworks given the impossibility to start fire. In particular, these optical transducers have been revealed to be particularly useful when used for applications such as, for example anti-intrusion systems (using the transducer to detect abrupt variations of pressure such as those caused by a person working on a sensitized carpet equipped with one of the presented transducers or by a hammer strike on a window), industrial pressure measurements (for example to count pieces or, in the case of traffic control application, to count the cars crossing a certain area), torsion/rotation measurements (for example to detect the opening of a valve or the lack of pressure in a pipeline used for highly flammable gasses), structural deformation measurements (for example deformations of concrete beams or of surfaces in composite materials).

In particular, excellent results have been obtained by using silica optical fibers; however, for the purpose of exploiting or realizing the optical transducers, also different optical fibers may be used.

While the present invention has been described with reference to particular embodiments, it has to be understood that the present invention is not limited to the particular embodiments described but rather that various amendments may be introduced into the embodiments described without departing from the scope of the present invention which is defied by the appended claims.

For instance, according to the circumstances, the noise rejection properties of all the embodiments described above may be improved by using the well known lock-in technique that is based on the modulation of the optical source 6a and by the selective amplification at the receiver side of only the signal component synchronized with the modulating signal. This can be implemented by different means, using either dedicated electronic circuits or proper software elaboration on the acquired data.

The invention claimed is:

1. An optical transducer for detecting forces acting on the transducer, comprising:
   an optical path adapted to transmit optical signals therethrough, the optical path comprising:
   sensing means adapted to modify the transmission of the optical signals through the optical path as a result of a force acting on the sensing means;
   polarization scrambling means adapted to modify the polarization of optical signals entering the optical path; and
   polarizing means adapted to emit optical signals of a predefined polarization;
   wherein the sensing means is between the polarization scrambling means and the polarizing means along the optical path.

2. A transducer as claimed in claim 1, wherein the optical path comprises an optical fiber.

3. A transducer as claimed in claim 2, wherein the polarization scrambling means comprises a first portion of the optical fiber.

4. A transducer as claimed in claim 3, wherein the first portion of the optical fiber comprises one or more loops of the optical fiber.

5. A transducer as claimed in claim 4, wherein at least one of the loops can be rotated so as to modify the polarization of the optical signals entering the optical path.

6. A transducer as claimed in claim 4, wherein at least one of the loops is fixed to a corresponding rotatable plate.

7. A transducer as claimed in claim 2, wherein the sensing means comprise a second portion of the optical fiber, adapted to be deformed as a result of a force acting thereon so as to modify the polarization of the optical signals transmitted through the optical path.

8. A transducer as claimed in claim 7, wherein the second portion of the optical fiber is fixed to a rotatable plate adapted to be rotated as a result of a force acting on the plate, so as to deform the second portion of the optical fiber, and wherein the deformation modifies the polarization of the optical signals transmitted through the optical path.

9. A transducer as claimed in claim 8, wherein the second portion of the optical fiber comprises at least one loop of the optical fiber.

10. A transducer as claimed in claim 9, wherein the at least one loop of the second portion of the optical fiber is embedded in the plate.

11. A transducer as claimed in claim 7, wherein the second portion of the optical fiber is embedded between a first resilient plate and a second resilient plate so as to be squashed as a result of a force acting on one of the plates.

12. A transducer as claimed in claim 11, wherein the first and second plates are of a rigid material selected from the group consisting of metal and Plexiglas.

13. A transducer as claimed in claim 7, wherein the second portion of the optical fiber is embedded in a beam adapted to be deformed as a result of a force acting thereon, thus deforming the second portion.

14. A transducer as claimed in claim 7, wherein the second portion of the optical fiber comprises at least one loop.

15. A transducer as claimed in claim 7, wherein the polarizing means comprises a third portion of the optical fiber.

16. A transducer as claimed in claim 15, wherein the third portion of the optical fiber has a predefined axis of polarization, thus allowing transmission of optical signals whose polarization is parallel to the predefined axis of polarization.

17. A transducer as claimed in one of claim 2, wherein the optical fiber is a single mode optical fiber.

18. A transducer as claimed in claim 17, wherein the optical fiber is a silica optical fiber.

19. A measuring device, comprising at least one optical transducer for detecting forces acting on the transducer, wherein the transducer includes:
   an optical fiber adapted to transmit optical signals through an optical path thereof, the optical fiber including:
   sensing means adapted to modify the transmission of the optical signals through the optical path as a result of a force acting on the sensing means;

polarization scrambling means adapted to modify the polarization of optical signals entering the optical path; and polarizing means adapted to emit optical signals of a predefined polarization;

wherein the sensing means is between the polarization scrambling means and the polarizing means along the optical path.

20. A measuring device as claimed in claim 19, further comprising:

at least one optical signal emitting device for introducing optical signals into the optical fiber; and at least one optical signal receiving device receiving optical signals exiting the optical fiber, respectively, the receiving device being further operative to convert optical signals into electrical signals.

21. A measuring device as claimed in claim 20, wherein the at least one emitting device comprises at least one laser diode, and the at least one receiving device comprises at least one diode.

22. A measuring system for measuring forces, comprising a measuring device, with at least one optical transducer for detecting forces acting on the transducer, wherein the transducer includes:

an optical fiber adapted to transmit optical signals through an optical path thereof, the optical fiber including sensing means adapted to modify the transmission of the optical signals through the optical path as a result of a force acting on the sensing means;

at least one optical signal emitting device for introducing optical signals into the optical fiber; and at least one optical signal receiving device receiving optical signals exiting the optical fiber, respectively, the receiving device being further operative to convert optical signals into electrical signals wherein the optical path includes:

polarization scrambling means adapted to modify the polarization of optical signals entering the optical path; and polarizing means adapted to emit optical signals of a predefined polarization;

wherein the sensing means is between the polarization scrambling means and the polarizing means along the optical path.

23. A measuring system as claimed in claim 22, further comprising computing means for computing the electrical signals exiting the receiving devices.

24. A measuring system as claimed in claim 22, further comprising a plurality of measuring devices and a threshold device adapted to generate threshold signals.

25. A method for detecting forces, comprising:

introducing optical signals into an optical path, wherein the optical path includes polarization scrambling means, sensing means, and polarizing means;

changing the polarization of the introduced optical signals to a predefined polarization with the polarization scrambling means;

modifying the polarization of optical signals from the polarization scrambling means as a result of a force on the sensing means;

introducing the modified optical signals into a polarizing means; and emitting optical signals of a predefined polarization from the polarizing means.

26. A method as claimed in claim 25, wherein the polarization of the optical signals entering the transducer is rendered substantially parallel to the axis of polarization of the polarizing means.

27. A method as claimed in claim 25, wherein the polarization of the optical signals entering the transducer is rendered substantially perpendicular to the axis of the polarizing means.

28. A method as claimed in claim 25, wherein optical signals of a predefined wavelength are introduced into the transducer.

29. A method as claimed in claim 25, wherein: the optical signals introduced into the transducer are generated by a optical signal emitting device and;

the optical signals are collected by an optical signal receiving device.

30. A method as claimed in claim 25, further comprising detecting a plurality of forces acting on a corresponding plurality of sensing points.

* * * * *

UNITED STATES PATENT AND TRADEMARK OFFICE
CERTIFICATE OF CORRECTION

PATENT NO. : 7,642,504 B2
APPLICATION NO. : 11/494864
DATED : January 5, 2010
INVENTOR(S) : Abrate et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 96 days.

Signed and Sealed this

Twenty-first Day of December, 2010

David J. Kappos
*Director of the United States Patent and Trademark Office*